(12) United States Patent
Hayakawa et al.

(10) Patent No.: US 11,441,522 B2
(45) Date of Patent: Sep. 13, 2022

(54) FUEL PUMP UNIT

(71) Applicant: DENSO CORPORATION, Kariya (JP)

(72) Inventors: Tetsuo Hayakawa, Kariya (JP); Hiromi Sakai, Kariya (JP); Daiji Furuhashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 16/061,070

(22) PCT Filed: Nov. 25, 2016

(86) PCT No.: PCT/JP2016/084871
§ 371 (c)(1),
(2) Date: Jun. 11, 2018

(87) PCT Pub. No.: WO2017/104376
PCT Pub. Date: Jun. 22, 2017

(65) Prior Publication Data
US 2018/0363607 A1 Dec. 20, 2018

(30) Foreign Application Priority Data
Dec. 17, 2015 (JP) .............................. JP2015-246453

(51) Int. Cl.
*F02M 37/02* (2006.01)
*F02M 37/44* (2019.01)
(Continued)

(52) U.S. Cl.
CPC ........... *F02M 37/02* (2013.01); *B01D 35/027* (2013.01); *F02M 37/045* (2013.01);
(Continued)

(58) Field of Classification Search
CPC ........ F02M 37/02; F02M 37/44; F02M 37/50; F02M 37/106; F02M 51/04; F02M 37/08;
(Continued)

(56) References Cited

U.S. PATENT DOCUMENTS

| 4,500,270 A | * | 2/1985 | Tuckey | ................. F04C 11/008 418/108 |
| 4,831,990 A | * | 5/1989 | Tuckey | ................ B60K 15/077 123/510 |

(Continued)

FOREIGN PATENT DOCUMENTS

| JP | 57-184250 | | 11/1982 |
| JP | 2011074865 A | * | 4/2011 |

(Continued)

*Primary Examiner* — Logan M Kraft
*Assistant Examiner* — Joshua Campbell
(74) *Attorney, Agent, or Firm* — Nixon & Vanderhye P.C.

(57) ABSTRACT

A fuel pump unit includes a suction filter and a fuel pump. The fuel pump includes: a rotatable shaft placed along a rotational axis; a rotor portion that rotates in response to rotation of the rotatable shaft; a suction hole portion, through which the fuel is suctioned into an inside of a rotor receiving chamber; and an outer peripheral wall that surrounds the suction hole portion. The suction filter includes: a filter element that filters the fuel and conducts the filtered fuel into an inside space; and a columnar hole portion having an inner peripheral wall, while the outer peripheral wall and the inner peripheral wall are fitted with each other, so that the columnar hole portion communicates between the inside space and the suction hole portion. The columnar hole portion is placed such that the rotational axis extends on an inner side of the inner peripheral wall.

8 Claims, 8 Drawing Sheets

(51) Int. Cl.
*F02M 37/10* (2006.01)
*F02M 37/50* (2019.01)
*F04C 2/10* (2006.01)
*F02M 37/04* (2006.01)
*F04C 13/00* (2006.01)
*B01D 35/027* (2006.01)
*F04C 15/06* (2006.01)
*F02D 41/30* (2006.01)

(52) U.S. Cl.
CPC .......... *F02M 37/10* (2013.01); *F02M 37/106* (2013.01); *F02M 37/44* (2019.01); *F02M 37/50* (2019.01); *F04C 2/102* (2013.01); *F04C 13/005* (2013.01); *F04C 13/008* (2013.01); *F02D 41/3082* (2013.01); *F04C 15/06* (2013.01); *F04C 2210/203* (2013.01)

(58) Field of Classification Search
CPC ........... F02M 37/48; F02M 2700/1358; B01D 35/027; F04C 2/102; F04C 13/005; F04C 13/008; F04C 15/06; F04C 2210/203; F02D 41/3845
USPC ......................................................... 123/509
See application file for complete search history.

(56) References Cited

U.S. PATENT DOCUMENTS

| | | | | |
|---|---|---|---|---|
| 4,869,225 A | * | 9/1989 | Nagata | F02M 37/106 123/509 |
| 5,110,265 A | * | 5/1992 | Kato | F02M 37/048 417/279 |
| 5,908,020 A | * | 6/1999 | Boutwell | F02M 37/10 123/541 |
| 6,345,609 B1 | * | 2/2002 | Djordjevic | F02M 59/06 123/456 |
| 6,423,221 B1 | * | 7/2002 | Kohlhaas | F02M 37/44 210/232 |
| 6,582,599 B2 | * | 6/2003 | Ito | B01D 35/0273 210/493.1 |
| 2005/0053500 A1 | * | 3/2005 | Suzuki | F16F 15/04 417/423.15 |
| 2005/0220641 A1 | | 10/2005 | Nagata et al. | |
| 2011/0139278 A1 | * | 6/2011 | Kawajiri | B01D 35/0273 137/565.01 |
| 2013/0098339 A1 | * | 4/2013 | Yoon | F02M 37/04 123/495 |
| 2013/0133765 A1 | * | 5/2013 | Israelson | F01C 21/10 137/565.13 |
| 2014/0227082 A1 | | 8/2014 | Ohashi et al. | |
| 2014/0363320 A1 | * | 12/2014 | Hayakawa | H02K 3/46 417/420 |
| 2015/0059705 A1 | | 3/2015 | Oohashi | |
| 2016/0288028 A1 | * | 10/2016 | Moreno | B01D 35/26 |

FOREIGN PATENT DOCUMENTS

JP 2017-015052 1/2017
WO WO-2007123037 A1 * 11/2007 .......... B01D 35/027

* cited by examiner

FUEL PUMP UNIT

CROSS REFERENCE TO RELATED APPLICATION

This application is the U.S. national phase of International Application No. PCT/JP2016/084871 filed Nov. 25, 2016 which designated the U.S. and claims priority to Japanese Patent Application No. 2015-246453 filed on Dec. 17, 2015, the entire contents of each of which are hereby incorporated by reference.

TECHNICAL FIELD

The present disclosure relates to a fuel pump unit that includes a suction filter and a fuel pump.

BACKGROUND ART

Previously, there is known a fuel pump unit that includes a suction filter and a fuel pump. In the fuel pump unit of the patent literature 1, the fuel pump suctions fuel, which is filtered through the suction filter. The fuel pump includes: a suction hole portion, through which fuel is suctioned into a rotor receiving chamber; and an outer peripheral wall, which surrounds the suction hole portion.

The suction filter includes a filter element and a columnar hole portion. The filter element filters the fuel and conducts the filtered fuel into an inside space of the filter element. The columnar hole portion has an inner peripheral wall and is configured in a columnar hole form. The outer peripheral wall and the inner peripheral wall are opposed to each other and are fitted with each other, so that the columnar hole portion communicates between the inside space and the suction hole portion.

Here, it is assumed that a central axis of this fuel pump is equivalent to a rotational axis of a rotatable shaft that rotates a rotor portion. In such a case, the columnar hole portion of the patent literature 1 is placed such that the rotational axis extends on an outer side of the inner peripheral wall. However, with this structure, vibrations, which would be generated at the fuel pump in response to rotation of the rotatable shaft, are likely transmitted to a specific location of the columnar hole portion. That is, the transmission of the vibrations is not uniform. Due to the non-uniform transmission of the vibrations, the suction filter may possibly be tilted relative to the fuel pump.

CITATION LIST

Patent Literature

PATENT LITERATURE 1: JP2014-152726A (corresponding to US2014/0227082A1)

SUMMARY OF INVENTION

The present disclosure is made in view of the above disadvantage, and it is an objective of the present disclosure to provide a fuel pump unit that can limit tilting of a suction filter.

According to the present disclosure, there is provided a fuel pump unit including:
 a suction filter that is configured to filter fuel; and
 a fuel pump that is configured to suction the filtered fuel, which is filtered through the suction filter, wherein:
 the fuel pump includes:
  a rotatable shaft that is placed along a rotational axis and is configured to be rotated;
  a rotor portion that is received in a rotor receiving chamber and is configured to rotate in response to rotation of the rotatable shaft;
  a suction hole portion, through which the fuel is suctioned into an inside of the rotor receiving chamber; and
  an outer peripheral wall that surrounds the suction hole portion;
 the suction filter includes:
  a filter element that is configured to filter the fuel and conduct the filtered fuel into an inside space of the filter element; and
  a columnar hole portion that has an inner peripheral wall and is configured in a columnar hole form, wherein the outer peripheral wall and the inner peripheral wall are opposed to each other and are fitted with each other, so that the columnar hole portion communicates between the inside space and the suction hole portion; and
 the columnar hole portion is placed such that the rotational axis extends on an inner side of the inner peripheral wall.

With the above construction, the columnar hole portion, which has the inner peripheral wall formed into the columnar hole form, communicates between the inside space of the filter element and the suction hole portion upon fitting of the inner peripheral wall to the outer peripheral wall that surrounds the suction hole portion in the fuel pump. The columnar hole portion is placed such that the rotational axis extends on the inner side of the inner peripheral wall. With the above construction, it is possible to limit tendency of transmitting vibrations, which would be generated at the fuel pump in response to the rotation of the rotatable shaft, to the specific location of the columnar hole portion. That is, a degree of uniformity in the transmission of the vibrations in the circumferential direction is increased, so that the tilting of the suction filter relative to the fuel pump can be limited.

DESCRIPTION OF EMBODIMENTS

Hereinafter, various embodiments of the present disclosure will be described. In each of the following embodiments, corresponding constituent components may be indicated by the same reference signs and may not be described redundantly for the sake of simplicity. In a case where only a portion of a structure is described in each of the following embodiments, the rest of the structure may be the same as that of a previously described other embodiment. Furthermore, besides an explicitly described combination of the constituent components described in each of the following embodiments, components of multiple embodiments may be partially combined even if such a combination is not explicitly described as long as such a combination does not cause a problem.

First Embodiment

Figure 1:
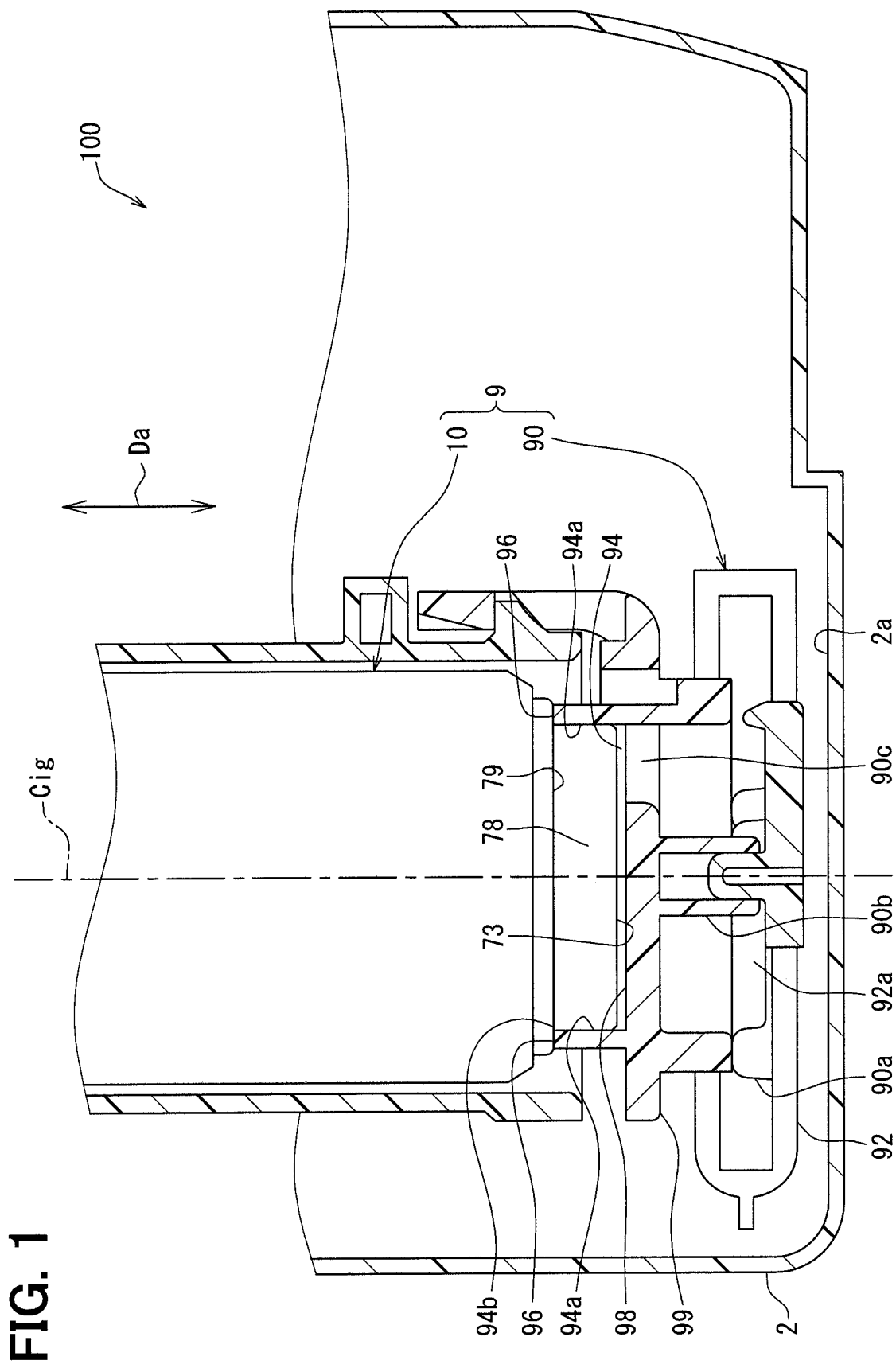
FIG. 1 is a partial cross-sectional view showing a fuel pump unit according to a first embodiment.
Figure 2:
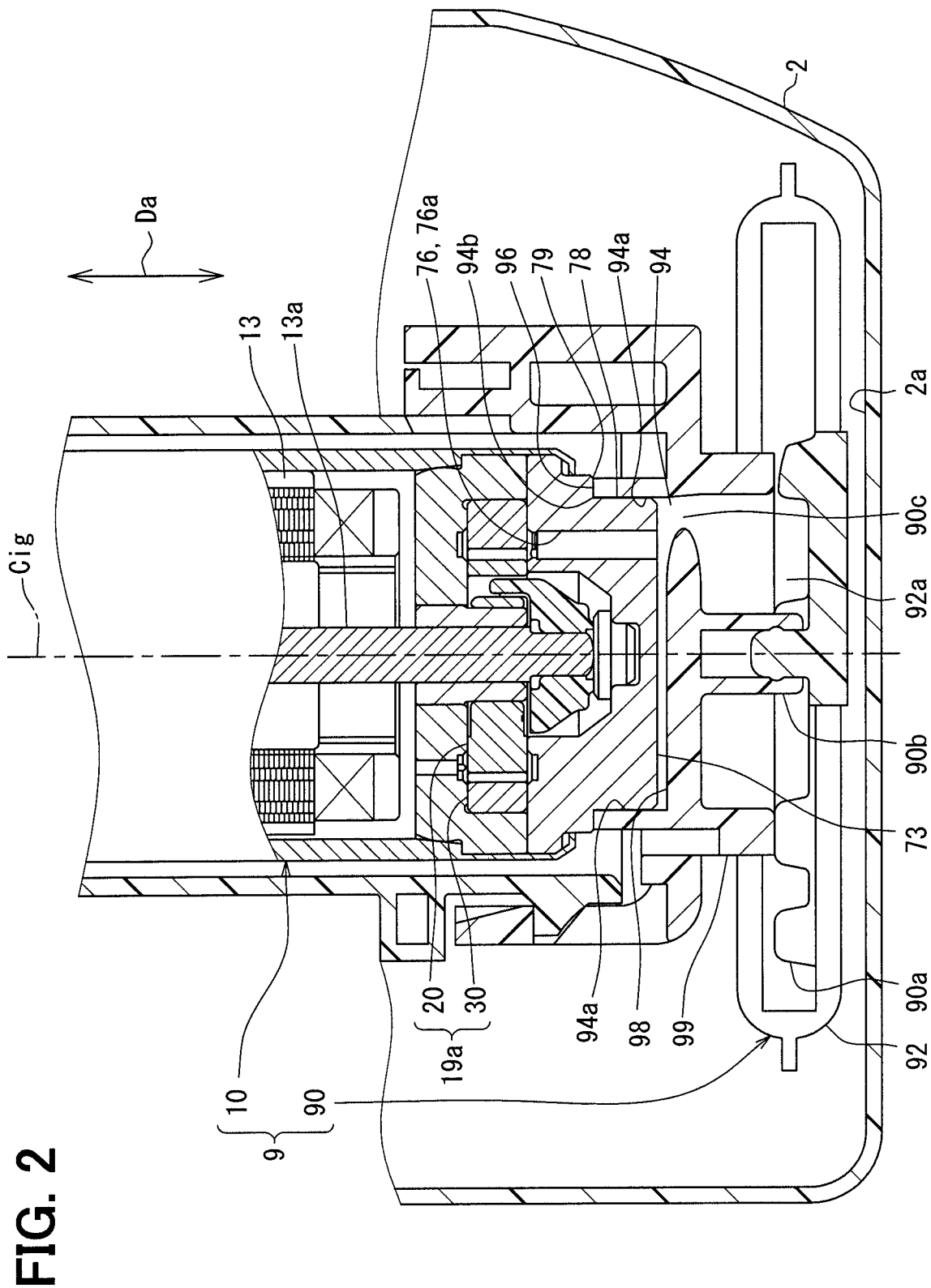
FIG. 2 is another partial cross-sectional view showing the fuel pump unit according to the first embodiment.

As shown in FIGS. 1 and 2, a fuel pump unit 9 according to a first embodiment of the present disclosure includes a suction filter 90 and a fuel pump 10, which are joined together. The fuel pump unit 9 is placed in a sub-tank 2 of a fuel pump module 100 that is installed in a fuel tank, which stores fuel, at a vehicle.

The fuel pump module 100 pumps the fuel of the fuel tank to an outside of the fuel tank to supply the fuel to an internal combustion engine. Although not shown in detail in the drawings, the fuel of the fuel tank is supplied into an inside of the sub-tank 2 through a flapper valve. The fuel in the sub-tank 2 is filtered through the suction filter 90 and is thereafter suctioned into the fuel pump 10. Thereafter, the fuel, which is discharged from the fuel pump 10, is conducted through a high pressure filter and a pressure regulator and is thereafter delivered to the outside of the fuel tank through a flange, which closes a fuel tank opening part at the fuel pump module 100. Here, the fuel of the present embodiment is light oil.

Figure 3:
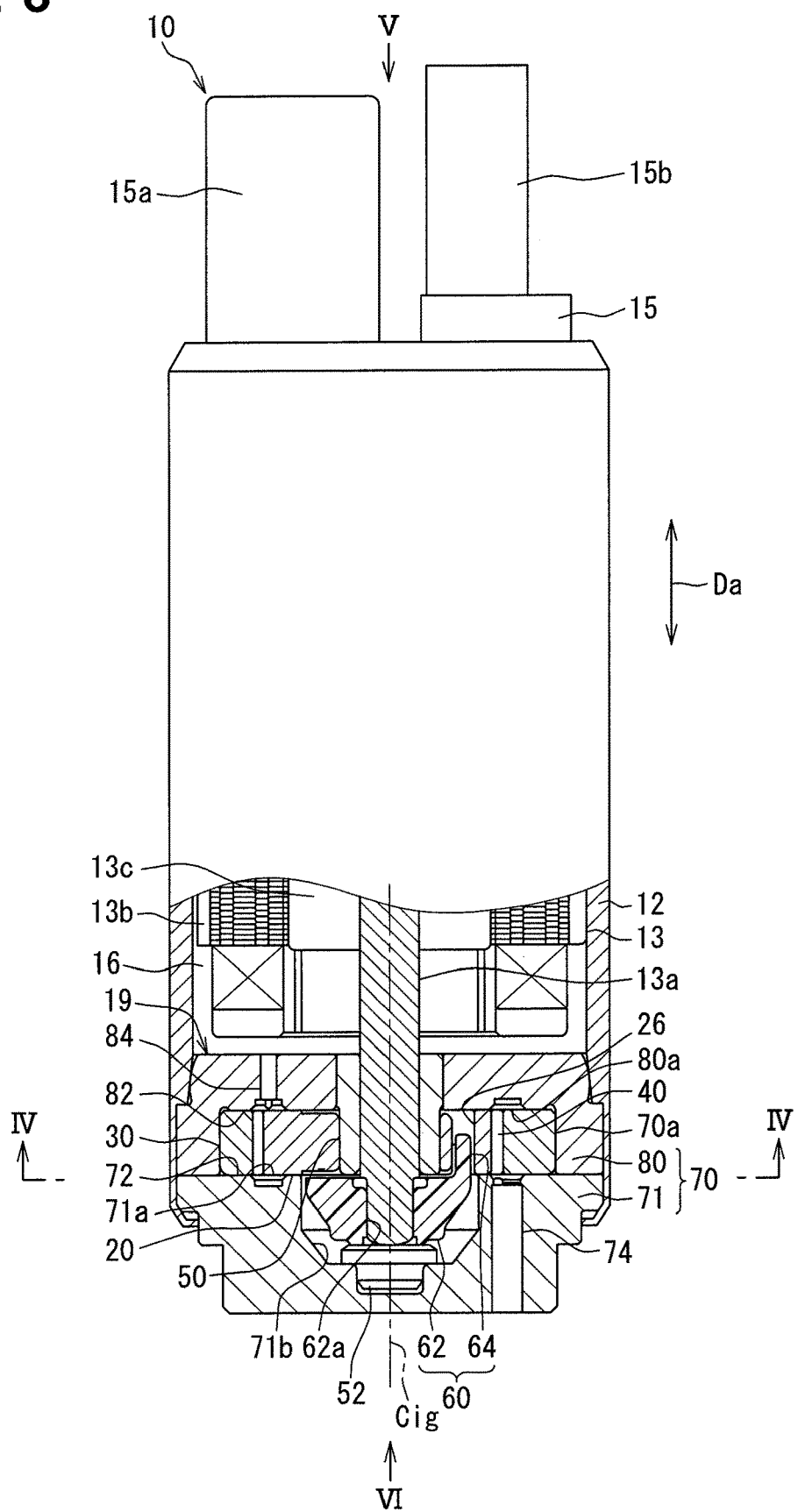
FIG. 3 is a partial cross-sectional view showing a fuel pump according to the first embodiment.

As shown in FIG. 3, the fuel pump 10 mainly includes: an electric motor 13 that is received in an inside of a pump body 12 shaped into an annular form; a pump main body 19; and a side cover 15 that projects to an opposite side, which is opposite from the pump main body 19 while the electric motor 13 is interposed between the pump main body 19 and the side cover 15 in an axial direction Da.

At the fuel pump 10, when an electric power is supplied from an external circuit to the electric motor 13 through an electric connector 15a of the side cover 15, a rotatable shaft 13a of the electric motor 13 is rotated. An outer gear 30 and an inner gear 20 of the pump main body 19 are rotated by a drive force of the rotatable shaft 13a. Thereby, the fuel, which is drawn into and is pressurized in a gear receiving chamber 70a, which receives the inner gear 20 and the outer gear 30, is discharged from a discharge outlet 15b of the side cover 15 through a fuel passage 16 located at an outside of the gear receiving chamber 70a.

In the present embodiment, an inner rotor brushless motor is used as the electric motor 13. The electric motor 13 includes a stator 13b and a rotor 13c. The stator 13b is fixed to the pump body 12 and is shaped into a cylindrical tubular form. The stator 13b has a winding portion that is molded by synthetic resin to form coils wound around six slots. The rotor 13c is placed on a radially inner side of the stator 13b and is formed into a cylindrical tubular form having the rotatable shaft 13a installed at a center thereof. Magnets, which form four poles, are formed at the rotor 13c. Thereby, the rotor 13c and the rotatable shaft 13a are rotated together. The rotatable shaft 13a is arranged at a pump center portion to extend along a rotational axis Cig that is set as an imaginary straight line, which extends in the axial direction Da. In the present embodiment, the axial direction Da substantially coincides with a direction of gravity at a time of driving the vehicle on the level ground or at a time of parking the vehicle on the level ground.

The pump main body 19 includes a joint member 60, the inner gear 20, the outer gear 30 and a pump housing 70.

The joint member 60 is a member that is made of synthetic resin (e.g., PPS resin) and relays the drive force of the rotatable shaft 13a to the inner gear 20. The joint member 60 includes a main body portion 62 and a plurality of insertion portions 64, which are formed integrally in one piece while the main body portion 62 has a fitting hole 62a, through which the rotatable shaft 13a is inserted. The insertion portions 64 are arranged at equal intervals in a circumferential direction. Each insertion portion 64 has flexibility because of a shape of the insertion portion 64 that extends from an outer peripheral region of the main body portion 62 in the axial direction toward the gear receiving chamber 70a side.

Figure 4:
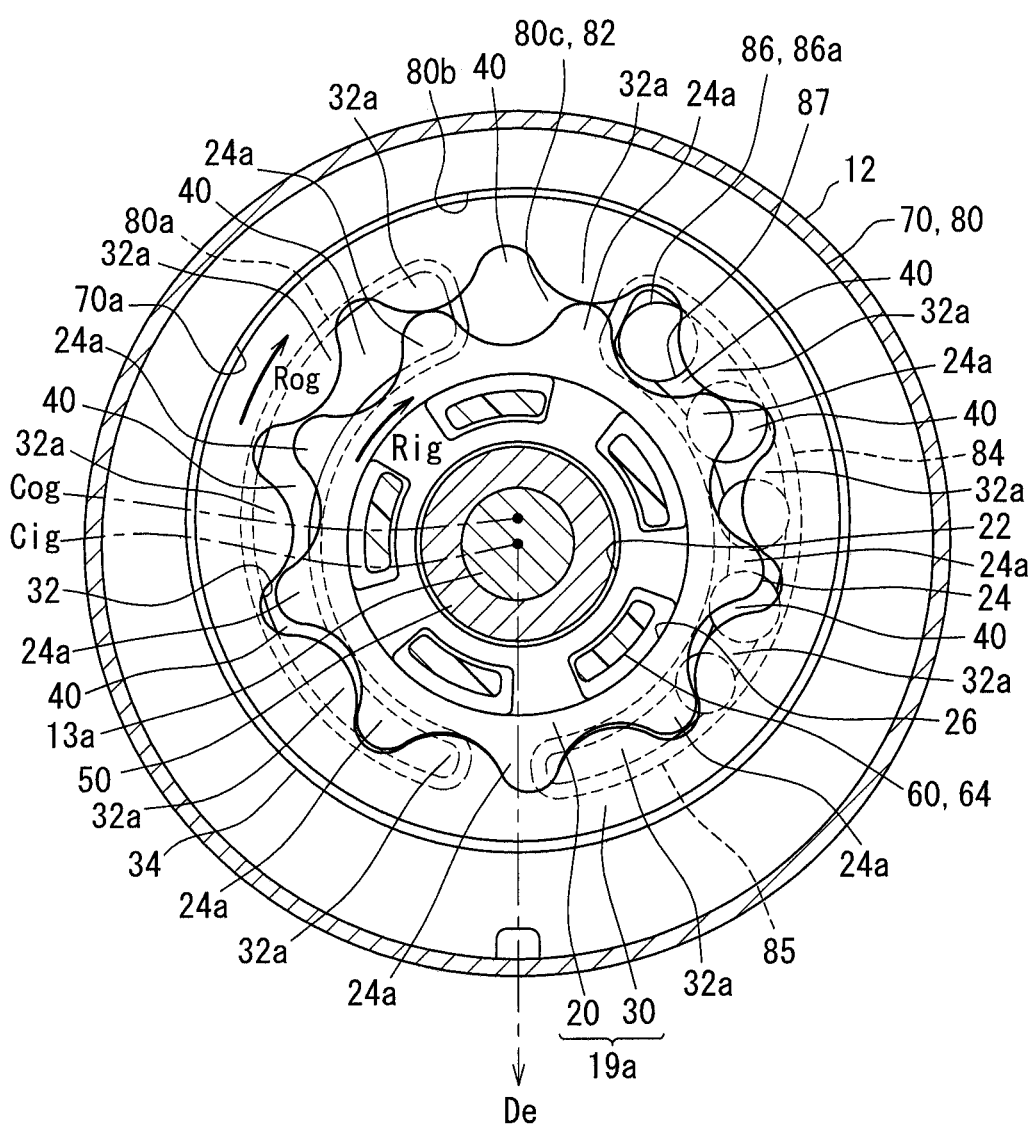
FIG. 4 is a cross-sectional view taken along line IV-IV in FIG. 3.
Figure 5:
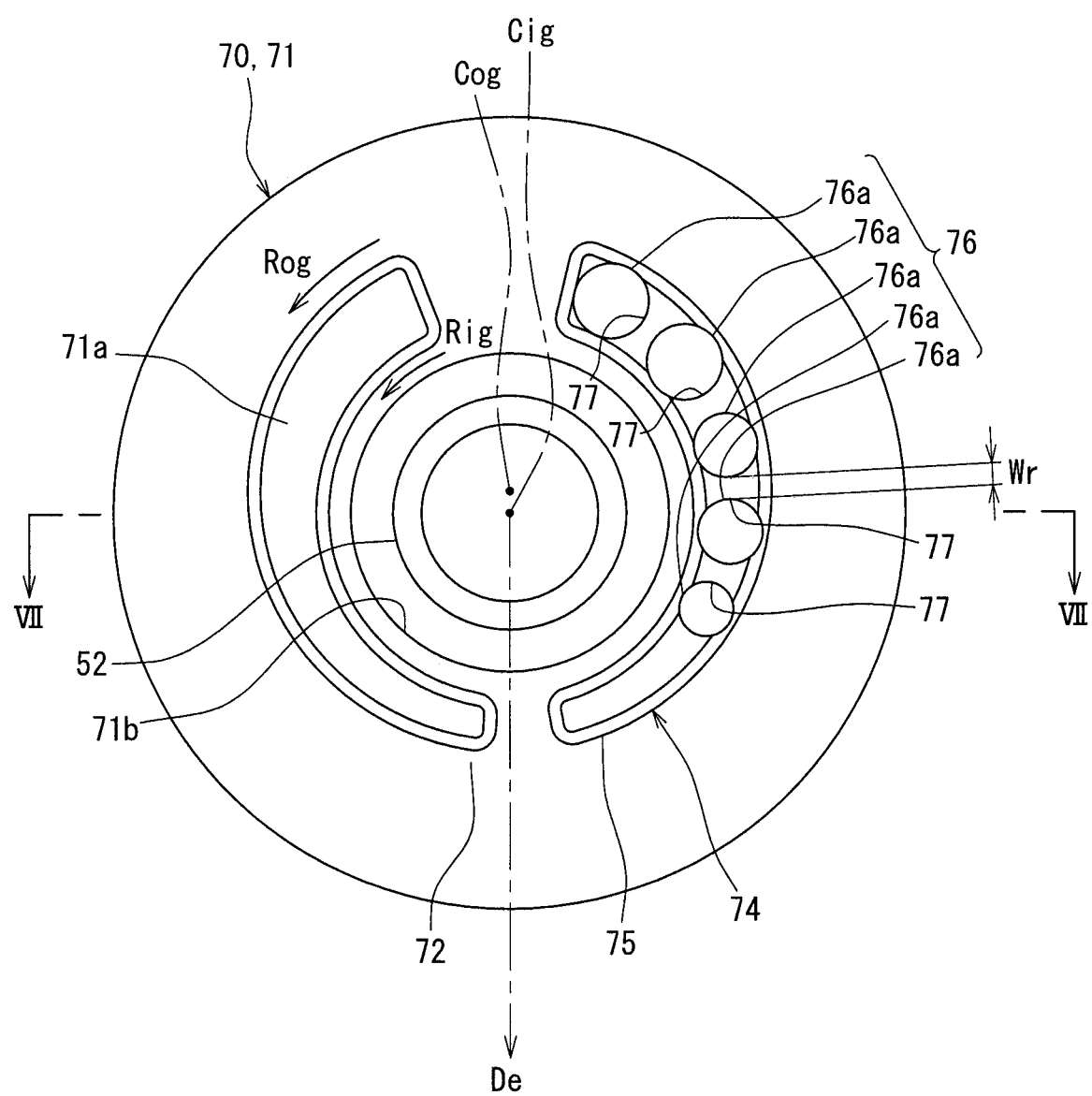
FIG. 5 is a view of a pump cover taken in a direction V in FIG. 3.
Figure 6:
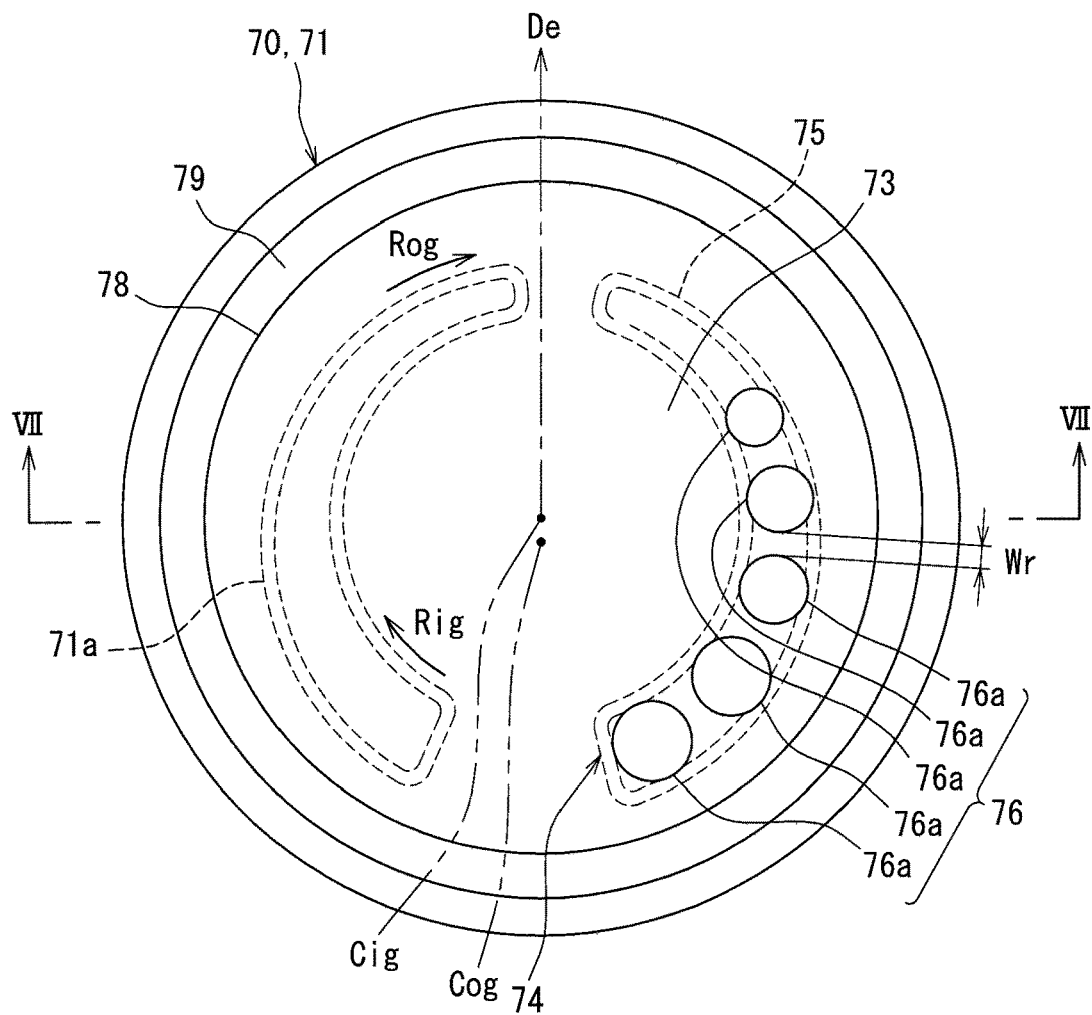
FIG. 6 is a view of the pump cover taken in a direction VI in FIG. 3.
Figure 7:
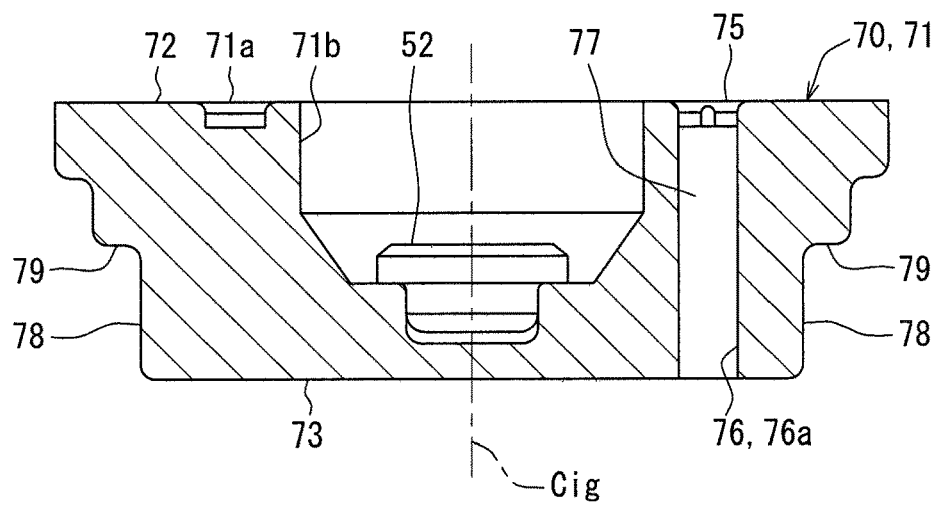
FIG. 7 is a cross-sectional view taken along line VII-VII in FIGS. 5 and 6.

The inner gear 20, which is shown in FIGS. 3 and 4, is made of a rigid metal material, such as an iron-based sintered material. The inner gear 20 is a trochoid gear that has a plurality of teeth, each of which is configured to have a trochoid curve. The inner gear 20 is coaxial with the rotatable shaft 13a, so that the inner gear 20 is eccentrically placed in the gear receiving chamber 70a.

The inner gear 20 has a plurality of insertion holes 26 at a location that is opposed to the main body portion 62 of the joint member 60 in the axial direction Da. The insertion holes 26 are arranged at equal intervals in the circumferential direction to correspond with the insertion portions 64, respectively. Each insertion hole 26 extends through the inner gear 20 in the axial direction Da.

Each insertion hole 26 receives a corresponding one of the insertion portions 64 while a gap is interposed therebetween. When the rotatable shaft 13a is rotated, the insertion portions 64 are respectively urged against the insertion holes 26. Thereby, the drive force of the rotatable shaft 13a is transmitted to the inner gear 20 through the joint member 60. That is, the inner gear 20 is rotatable about the rotational axis Cig, which is coaxial with the rotatable shaft 13a, in a rotational direction Rig. In FIG. 4, only some of the insertion holes 26 and some of the insertion portions 64 are indicated with the corresponding reference signs.

Furthermore, as shown in FIG. 4, the inner gear 20 has a plurality of external teeth 24a, which are formed at an outer peripheral portion 24 of the inner gear 20 and are arranged at equal intervals in the rotational direction Rig.

The outer gear 30, which is shown in FIGS. 3 and 4, is also made of a rigid metal material, such as an iron-based sintered material. The outer gear 30 is a trochoid gear that has a plurality of teeth, each of which is configured to have a trochoid curve. The outer gear 30 is eccentric to the rotational axis Cig, so that the outer gear 30 is coaxially placed in the gear receiving chamber 70a. Thereby, the inner gear 20 is eccentrically displaced from the outer gear 30 in an eccentric direction De that is a radial direction of the outer gear 30.

As shown in FIG. 4, the outer gear 30 is eccentric to the rotational axis Cig while an imaginary outer central axis Cog, which extends in the axial direction Da, serves as a rotational axis of the outer gear 30. Thereby, the outer gear 30 is rotatable about the outer central axis Cog in a rotational direction Rog synchronously with the rotation of the inner gear 20. The outer gear 30 has a plurality of internal teeth 32a, which are formed at an inner peripheral portion 32 of the outer gear 30 and are arranged at equal intervals in the rotational direction Rog. The number of the internal teeth 32a of the outer gear 30 is set to be larger than the number of the external teeth 24a of the inner gear 20 by one. In the present embodiment, the number of the internal teeth 32a is ten, and the number of the external teeth 24a is nine.

The inner gear 20 is meshed to the outer gear 30 due to the eccentricity of the inner gear 20 relative to the outer gear 30 in the eccentric direction De. Thereby, at the eccentric side, the inner gear 20 and the outer gear 30 are meshed with each other with less clearance therebetween. However, at the opposite side, which is opposite from the eccentric side, a plurality of pump chambers 40 is continuously formed one after another at a location between the inner gear 20 and the outer gear 30. Volumes of these pump chambers 40 are expanded and thereafter contracted through rotation of the outer gear 30 and the inner gear 20 in response to rotation of the rotatable shaft 13a. The outer gear 30 and the inner gear 20 form a rotor portion 19a that is rotated in the gear receiving chamber 70a that serves as a rotor receiving chamber.

As shown in FIG. 3, the pump housing 70 defines the gear receiving chamber 70a, which is configured into a cylindrical form and rotatably receives the inner gear 20 and the outer gear 30, by stacking a pump cover 71 and a pump casing 80 together in the axial direction Da. Thus, the pump housing 70 holds the inner gear 20 and the outer gear 30 from two opposite sides in the axial direction Da, and thereby the pump housing 70 forms a pair of slide surfaces 72, 82, which are respectively formed as planar surfaces and along which the inner gear 20 and the outer gear 30 are slid.

The pump cover 71, which is shown in FIGS. 3 and 5-7, is a constituent component of the pump housing 70. The pump cover 71 is formed by applying a surface treatment, such as plating, to a base material made of rigid metal (e.g., a steel material), and thereby the pump cover 71 is formed into a disc body having abrasion resistance.

An opening planar surface 73, which is shaped into a circular planar form, is raised to the outside at the suction filter 90 side of the pump cover 71, which is opposite from the electric motor 13 in the axial direction Da. The pump cover 71 includes an outer peripheral wall 78 that is joined to an outer peripheral edge of the opening planar surface 73 and faces a radially outer side. The suction filter 90 side of the pump cover 71 is formed into a cylindrical form by the opening planar surface 73 and the outer peripheral wall 78.

A stopper wall 79, which is connected to the outer peripheral wall 78 and faces the suction filter 90 side in the axial direction Da, is formed at an opposite side of the outer peripheral wall 78, which is opposite from the opening planar surface 73, such that the stopper wall 79 is placed on the radially outer side of the outer peripheral wall 78 at the gear receiving chamber 70a side of the outer peripheral wall 78. The stopper wall 79 is formed into a ring form such that the stopper wall 79 surrounds the outer peripheral wall 78 along an entire circumferential extent of the outer peripheral wall 78.

At the inside of the fuel pump 10, the pump cover 71 has a joint receiving chamber 71b at a location that is along the rotational axis Cig and is opposed to the inner gear 20. The joint receiving chamber 71b receives the main body portion 62 of the joint member 60. The joint receiving chamber 71b is recessed from the slide surface 72 in the axial direction Da. A thrust bearing 52 is securely fitted to a bottom portion of the joint receiving chamber 71b along the rotational axis Cig to rotatably support the rotatable shaft 13a in the axial direction Da.

The pump cover 71 includes a suction port 74 on a radially outer side of the joint receiving chamber 71b. The suction port 74 suctions the fuel from an outside of the gear receiving chamber 70a into an inside of the gear receiving chamber 70a. The suction port 74 includes a suction extension groove 75 and a suction hole portion 76. The suction extension groove 75 is in a form of an arcuate groove that is recessed from the slide surface 72 and extends in the circumferential direction of the pump cover 71. The suction hole portion 76 includes a plurality of suction opening holes 76a. The number of the suction opening holes 76a is, for example, five, and these suction opening holes 76a are arranged one after another in an extending direction of the suction extension groove 75. Each suction opening hole 76a is in a form of a cylindrical hole that penetrates through the pump cover 71 in the axial direction Da, so that the suction opening hole 76a opens in a bottom portion of the suction extension groove 75 and also opens in the opening planar surface 73 located on the suction filter 90 side. Thereby, the suction hole portion 76 is surrounded by the outer peripheral wall 78 that extends along the entire circumferential extent.

Each of the suction opening holes 76a has a corresponding opening cross sectional area that corresponds to a volume of the corresponding pump chamber 40 that is opposed to the suction opening hole 76a, so that the opening cross sectional area of one of the suction opening holes 76a, which is opposite from the eccentric side and is furthest from the eccentric side, is set to be the largest among the suction opening holes 76a. A reinforcement rib 77 is formed between each adjacent two of the suction opening holes 76a to reinforce the pump cover 71. A width Wr of each reinforcement rib 77 between the corresponding adjacent two of the suction opening holes 76a is substantially identically set.

The pump casing 80, which is shown in FIGS. 3 and 4, is a constituent component of the pump housing 70. The pump casing 80 is formed by applying a surface treatment, such as plating, to a base material made of rigid metal (e.g., a steel material), and thereby the pump casing 80 is formed into a bottomed cylindrical tubular body having abrasion resistance. An opening part of the pump casing 80 is covered with the pump cover 71 and is thereby closed along an entire circumferential extent of the opening part of the pump casing 80. An inner peripheral portion 80b of the pump casing 80 is in a form of a cylindrical hole that is eccentric to the rotational axis Cig and is coaxial with the outer central axis Cog.

A radial bearing 50 is securely fitted to a recessed bottom portion 80c of the pump casing 80 along the rotational axis Cig to rotatably support the rotatable shaft 13a, which extends through the recessed bottom portion 80c.

The pump casing 80 includes a discharge port 84 that is located on a radially outer side of the radial bearing 50 and discharges the fuel from the inside to the outside of the gear receiving chamber 70a. The discharge port 84 includes a discharge extension groove 85 and a discharge hole portion 86. The discharge extension groove 85 is in a form of an arcuate groove that is recessed from the slide surface 82 and extends in the circumferential direction of the pump casing 80. The discharge hole portion 86 includes a plurality of discharge opening holes 86a. Each of the discharge opening holes 86a is in a form of a cylindrical hole that penetrates through the pump casing 80 in the axial direction Da, so that the discharge opening hole 86a opens in a bottom portion of the discharge extension groove 85 and also opens in the fuel passage 16. A reinforcement rib 87 is formed between each adjacent two of the discharge opening holes 86a to reinforce the pump casing 80. In FIG. 4, only a part of the discharge hole portion 86, one of the discharge opening holes 86a and one of the reinforcement ribs 87 are indicated with the corresponding reference signs, respectively.

As shown in FIG. 3, in the recessed bottom portion 80c of the pump casing 80, an opposing suction groove 80a is formed at a corresponding location, which is opposed to the suction extension groove 75 of the suction port 74 while the gear receiving chamber 70a is interposed between the opposing suction groove 80a and the suction extension groove 75. The opposing suction groove 80a is in a form of an arcuate groove that is configured to a shape formed by projecting the suction extension groove 75 in the axial direction Da. The opposing suction groove 80a is recessed from the slide surface 82. In this way, at the pump casing 80, a configuration of the discharge extension groove 85 of the discharge port 84 and a configuration of the opposing suction groove 80a are substantially symmetric to each other about a corresponding symmetry line. The discharge extension groove 85 and the opposing suction groove 80a are separated from each other by the slide surface 82.

In the pump cover 71, an opposing discharge groove 71a is formed at a location, which is opposed to the discharge extension groove 85 of the discharge port 84 while the gear receiving chamber 70a is interposed between the opposing discharge groove 71a and the discharge extension groove 85. The opposing discharge groove 71a is in a form of an arcuate groove that is configured to a shape formed by projecting the discharge extension groove 85 in the axial direction Da. The opposing discharge groove 71a is recessed from the slide surface 72. In this way, at the pump cover 71, a configuration of the suction extension groove 75 of the suction port 74 and a configuration of the opposing discharge groove 71a are substantially symmetric to each other about a corresponding symmetry line. The suction extension groove 75 and the opposing discharge groove 71a are separated from each other by the slide surface 72.

At the gear receiving chamber 70a, which is defined by the pump housing 70, a thickness of the inner gear 20 is set to be slightly smaller than a distance between the slide surfaces 72, 82. In this way, an inner peripheral portion 22 of the inner gear 20 is radially supported by the radial bearing 50 in a rotatable manner, and two opposite sides of the inner gear 20, which are opposed to each other in the axial direction Da, are rotatably supported by the slide surfaces 72, 82.

An outer diameter of the outer gear 30 is set to be slightly smaller than an inner diameter of the pump casing 80. A thickness of the outer gear 30 is set to be slightly smaller than the distance between the slide surfaces 72, 82. In this way, an outer peripheral portion 34 of the outer gear 30 is supported by the inner peripheral portion 80b of the pump casing 80 in a rotatable manner, and two opposite sides of the outer gear 30, which are opposed to each other in the axial direction Da, are rotatably supported by the slide surfaces 72, 82.

A volume of each corresponding pump chamber 40, which is opposed to and is communicated with the suction port 74 and the opposing suction groove 80a, is increased in response to the rotation of the gears 20, 30. Thereby, the fuel is suctioned into this pump chamber 40 in the gear receiving chamber 70a through the suction hole portion 76 of the suction port 74. Here, each of the suction opening holes 76a of the suction hole portion 76 is communicated with the suction extension groove 75, which is recessed from the slide surface 72, so that the suctioning of the fuel into the pump chamber 40 through the suction opening hole 76a is maintained while the pump chamber 40 is opposed to the suction extension groove 75.

A volume of each corresponding pump chamber 40, which is opposed to and is communicated with the discharge port 84 and the opposing discharge groove 71a, is decreased in response to the rotation of the gears 20, 30. Therefore, simultaneously with the suctioning function described above, the fuel of the pump chamber 40 is discharged to the outside of the gear receiving chamber 70a through the discharge hole portion 86 of the discharge port 84. Here, each of the discharge opening holes 86a of the discharge hole portion 86 is communicated with the discharge extension groove 85, which is recessed from the slide surface 82, so that the discharging of the fuel from the pump chamber 40 is maintained while the pump chamber 40 is opposed to the discharge extension groove 85.

As discussed above, the fuel, which is filtered through the suction filter 90, is suctioned through the suction port 74 of the fuel pump 10. The fuel, which is discharged through the discharge port 84 after being sequentially suctioned into the pump chambers 40 of the gear receiving chamber 70a through the suction port 74, is discharged from the discharge outlet 15b to the outside of the fuel pump 10 through the fuel passage 16.

The suction filter 90 shown in FIGS. 1 and 2 is placed at the bottom portion of the sub-tank 2. The suction filter 90 includes a filter element 92, a columnar hole portion 94, a contact portion 96, and an opposing wall 98.

The filter element 92 is shaped into a bag form that forms an inside space 92a therein. The filter element 92 extends along a sub-tank bottom wall 2a while a gap is interposed between the filter element 92 and the sub-tank bottom wall 2a in the axial direction Da. The filter element 92 is configured to filter foreign objects, such as sand, dust, rust of a tank of a gas station, and conduct the filtered fuel to the inside space 92a. More specifically, a viscosity of the light oil, which serves as the fuel, is higher than that of the gasoline. Particularly, under the low temperature state, the light oil is turned into a jelly like form. Therefore, in order to ease the suctioning of such light oil, the filter element 92 has a pore size (e.g., 100 to 200 µm) that is larger than a pore size of a filter element used for the gasoline.

Furthermore, a framework 90a is placed in the inside space 92a of the filter element 92. The framework 90a maintains the shape of the filter element 92, which is in the bag form. If the filter element 92 is tilted, a contact surface area of the filter element 92, which contacts the fuel, is reduced at the time of, for example, reducing the amount of fuel in the sub-tank 2. In such a case, the amount of suctioned fuel, which is suctioned through the filter element 92, may possibly be reduced. Also, when the filter element 92 contacts the sub-tank bottom wall 2a, noises may be generated by vibrations.

The columnar hole portion 94, the contact portion 96 and the opposing wall 98 are integrally formed in one piece from rigid resin, such as polyphenylene sulfide (PPS) resin or polyacetal (POM) resin to constitute a joining member 99 that is formed in a generally cylindrical tubular form.

The columnar hole portion 94 is formed into a cylindrical columnar hole form and has an inner peripheral wall 94a. One end part of the columnar hole portion 94 is communicated with the inside space 92a of the filter element 92. The other end part of the columnar hole portion 94, which is located on the fuel pump 10 side, is opened as an opening part 94b, so that the columnar hole portion 94 can be fitted to the fuel pump 10 through the opening part 94b. The contact portion 96 is in a form of a ring that is connected to an opening part 94b of the columnar hole portion 94 on a radially outer side of the opening part 94b of the columnar hole portion 94, and the contact portion 96 is opposed to the fuel pump 10 in the axial direction Da. Thereby, the contact portion 96 forms a tube end part of the joining member 99.

That is, the contact portion 96 is placed on a radially outer side of the inner peripheral wall 94a.

The suction filter 90, which is constructed in the above-described manner, is joined to the fuel pump 10 by press fitting the joining member 99 to the pump cover 71 in the axial direction Da. Specifically, the columnar hole portion 94 is fitted to the outer peripheral wall 78 of the fuel pump 10 such that the inner peripheral wall 94a of the columnar hole portion 94 is opposed to the outer peripheral wall 78 of the fuel pump 10 in the radial direction. Particularly, in the present embodiment, since the columnar hole portion 94 is fitted to the fuel pump 10 by the press fitting, the outer peripheral wall 78 and the inner peripheral wall 94a are in pressure contact with each other along the entire circumferential extent thereof. Furthermore, since the contact portion 96 contacts the stopper wall 79 of the fuel pump 10 in the axial direction Da along the entire circumferential extent of the contact portion 96, it is possible to limit positional deviation of the suction filter 90 relative to the fuel pump 10. With the above-described joint, the columnar hole portion 94 communicates between the inside space 92a of the filter element 92 and the respective suction opening holes 76a of the suction hole portion 76 together.

Here, the columnar hole portion 94 is placed such that the rotational axis Cig extends on the inside of the inner peripheral wall 94a. Particularly, in the present embodiment, the rotational axis Cig substantially coincides with the center of the columnar hole portion 94, so that the columnar hole portion 94 is placed coaxially with the rotatable shaft 13a. Furthermore, the outer central axis Cog, which is eccentric to the rotational axis Cig, is placed such that the outer central axis Cog also extends on the inner side of the inner peripheral wall 94a. Furthermore, the inner peripheral wall 94a is placed on the radially outer side of the inner gear 20, which is coupled to the rotatable shaft 13a, and the rotor 13c of the electric motor 13.

The opposing wall 98 projects radially inward from the inner peripheral wall 94a on the filter element 92 side of the opening planar surface 73 that is surrounded by the inner peripheral wall 94a at the inside of the columnar hole portion 94. The opposing wall 98 is opposed to the opening planar surface 73 in the axial direction Da while a gap is interposed between the opposing wall 98 and the opening planar surface 73. A connecting portion 90b projects from a portion of the opposing wall 98, which is located along the rotational axis Cig, toward the filter element 92, such that the connecting portion 90b is joined to the framework 90a. The opposing wall 98 does not completely close the columnar hole portion 94, so that a hollow portion 90c, which is in a hollow form, is formed at a corresponding location that overlaps with the suction hole portion 76 in the axial direction Da in the columnar hole portion 94.

Effects and Advantages

Effects and advantages of the first embodiment will now be described.

According to the first embodiment, the columnar hole portion 94, which has the inner peripheral wall 94a configured in the form of the columnar hole, communicates between the inside space 92a of the filter element 92 and the suction hole portion 76 upon fitting of the inner peripheral wall 94a to the outer peripheral wall 78, which surrounds the suction hole portion 76 at the fuel pump 10. The columnar hole portion 94 is placed such that the rotational axis Cig passes through the inside of the inner peripheral wall 94a. With the above construction, it is possible to limit tendency of transmitting vibrations, which would be generated at the fuel pump 10 in response to the rotation of the rotatable shaft 13a, to a specific location of the columnar hole portion 94. That is, a degree of uniformity in the transmission of the vibrations in the circumferential direction is increased, so that the tilting of the suction filter 90 relative to the fuel pump 10 can be limited.

Furthermore, according to the first embodiment, even when the suction filter 90 is forced to tilt in response to the transmission of the vibrations generated at the fuel pump 10, the contact portion 96 can receive a force, which limits the tilting of the suction filter 90, from the fuel pump 10 due to the contacting of the contact portion 96 to the fuel pump 10 in the axial direction Da. Therefore, the tilting of the suction filter 90 can be limited.

Furthermore, according to the first embodiment, the contact portion 96 is in the form of the ring that is connected to the opening part 94b of the columnar hole portion 94 on the radially outer side of the opening part 94b of the columnar hole portion 94. Therefore, the contact portion 96 and the fuel pump 10 contact with each other in the ring form in the axial direction Da at the location, which is on the radially outer side of the inner peripheral wall 94a that surrounds the rotational axis Cig. Under this circumstance, even when the suction filter 90 is forced to tilt in any direction in response to the transmission of the vibrations generated at the fuel pump 10, the contact portion 96 can reliably receive the counteracting force that limits the tilting of the suction filter 90. Therefore, the tilting of the suction filter 90 can be limited.

Furthermore, according to the first embodiment, the columnar hole portion 94 is shaped in the cylindrical columnar hole form that is coaxial with the rotatable shaft 13a. When the columnar hole portion 94 and the rotatable shaft 13a are coaxially placed in the manner described above, the uniformity of the vibration transmission in the circumferential direction is increased. Thereby, the tilting of the suction filter 90 can be further limited.

Furthermore, according to the first embodiment, the suction hole portion 76 opens in the opening planar surface 73 that is in the form of the planar surface. Therefore, when the fuel is suctioned from the inside space 92a of the filter element 92 into the suction hole portion 76 through the columnar hole portion 94, the generation of turbulence in the fuel flow is limited. Thereby, the pressure change, the pressure pulsation or the vibration of the fuel can be limited.

Second Embodiment

Figure 8:
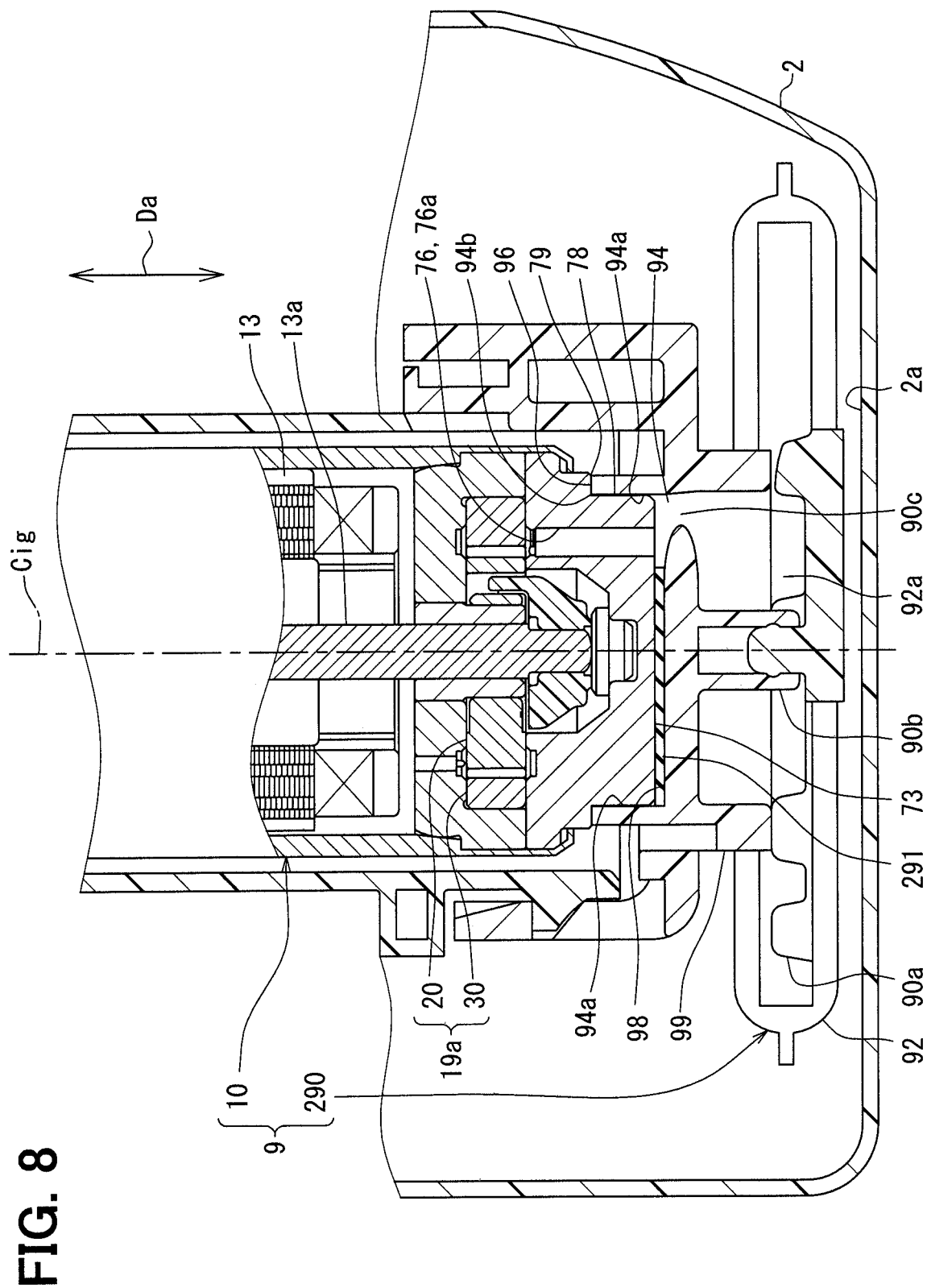
FIG. 8 is a partial cross-sectional view showing a second embodiment, corresponding to FIG. 2.

As shown in FIG. 8, a second embodiment of the present disclosure is a modification of the first embodiment. The second embodiment will be mainly discussed with respect to differences, which are different from the first embodiment.

The fuel pump 10 of the second embodiment includes the opening planar surface 73, in which the suction hole portion 76 opens, like in the first embodiment.

Like in the first embodiment, the suction filter 290 of the second embodiment includes the opposing wall 98 that is opposed to the opening planar surface 73 in the axial direction Da. Unlike the first embodiment, the suction filter 290 further includes an elastic member 291.

The elastic member 291 is, for example, a rubber packing mainly made of a synthetic rubber and is shaped into a partially circular form having a thin wall. The elastic member 291 is elastically deformable. The elastic member 291 is placed between the opening planar surface 73 and the opposing wall 98 and can exert an elastic force against the opening planar surface 73 and the opposing wall 98. The fuel pump 10 and the suction filter 290 contact with each other in the axial direction Da through the elastic member 291.

According to the second embodiment, the elastic member 291 is placed between the opening planar surface 73 and the opposing wall 98. The elastic member 291 can absorb the vibrations, which are generated at the fuel pump 10, through resilient deformation of the elastic member 291. Therefore, it is possible to limit the tilting of the suction filter 290.

Other Embodiments

The embodiments of the present disclosure have been described. However, the present disclosure should not be limited to these embodiments and may be applied to other various embodiments and a combination(s) of the embodiments without departing from the scope of the present disclosure.

Figure 9:
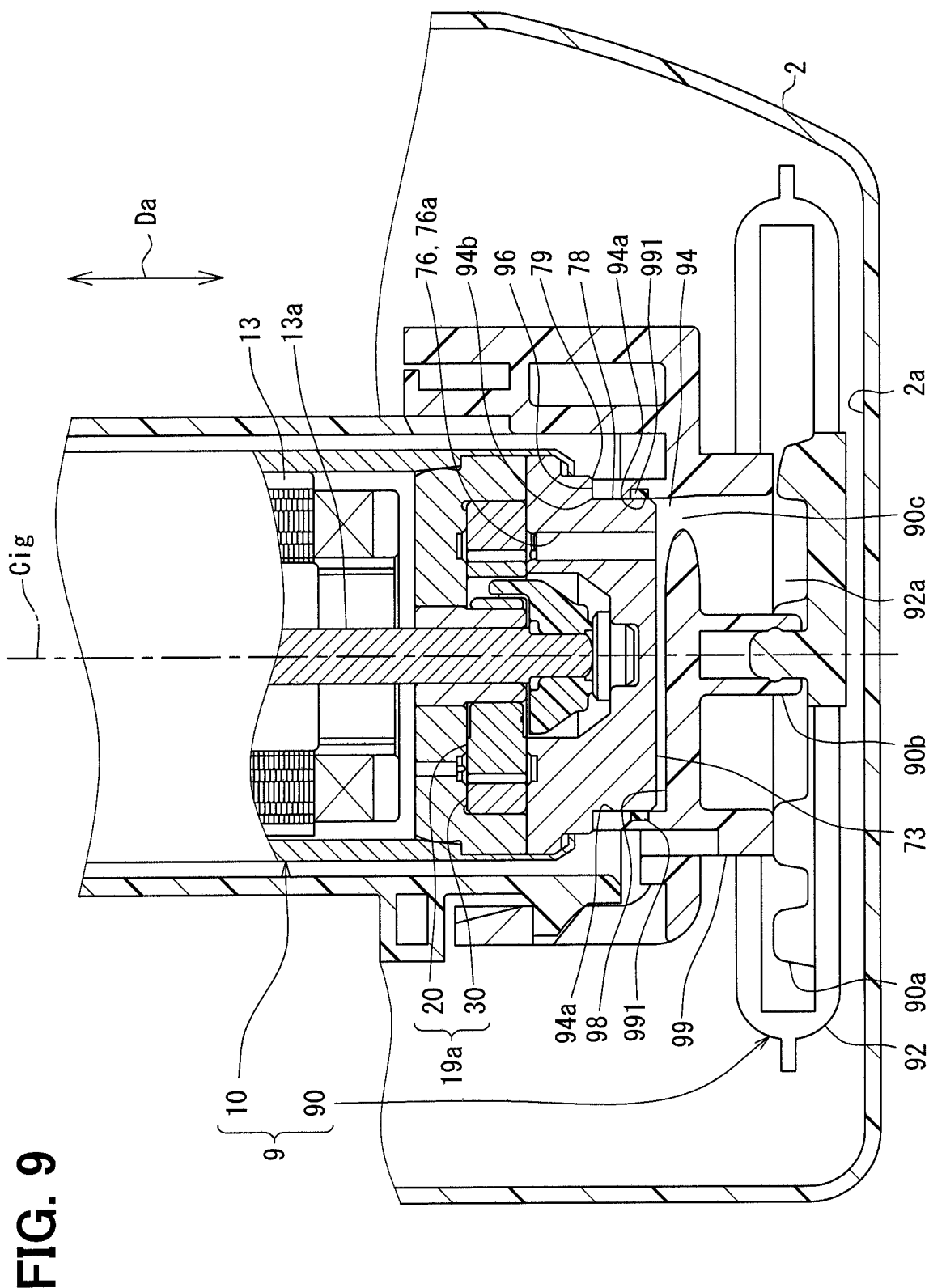
FIG. 9 is a partial cross-sectional view showing a first modification, corresponding to FIG. 2.

Specifically, as a first modification, the suction filter 90 may have an elastic member at the inner peripheral wall 94a. As an example of this modification, as shown in FIG. 9, a rubber packing, which is shaped into a circular ring form and serves as an elastic member 991, is embedded in a portion of the inner peripheral wall 94a.

As a second modification, the contact portion 96 may be not necessary limited to be the form of the ring that is connected to the opening part 94b of the columnar hole portion 94 on the radially outer side of the opening part 94b of the columnar hole portion 94. For example, the opposing wall 98 may be modified such that the opposing wall 98 contacts the opening planar surface 73 of the fuel pump 10 in the axial direction Da to serve as the contact portion 96. Furthermore, for example, claws, which make snap fitting and serve as the contact portion 96, may be formed at the suction filter 90 such that the claws contact the fuel pump 10 in the axial direction Da.

As a third modification, the columnar hole portion 94 may be slightly eccentric to the rotational axis Cig as long as the rotational axis Cig extends on the inner side of the inner peripheral wall 94a.

As a fourth modification, the columnar hole portion 94 may be shaped into another columnar hole form, such as an elliptic columnar hole form, a polygonal columnar hole form, which is other than the cylindrical columnar hole form.

As a fifth modification, the suction hole portion 76 may open at another surface, such as a curved surface, which is other than the opening planar surface 73 that is shaped into the planar surface form.

As a sixth modification, the suction hole portion 76 may be formed by a single suction opening hole 76a. The outer peripheral wall 78 may be configured to surround the single suction opening hole 76a, which is formed as the suction hole portion 76.

As a seventh modification, gasoline, or liquid fuel, which is equivalent to the light oil and the gasoline, may be used as the fuel that is filtered and is suctioned at the fuel pump unit 9.

The invention claimed is:

1. A fuel pump unit to be installed in a sub-tank comprising:
    a suction filter that is configured to filter fuel; and
    a fuel pump that is configured to suction the filtered fuel, which is filtered through the suction filter, wherein:
    the fuel pump includes:
        a rotatable shaft that is placed along a rotational axis and is configured to be rotated, the rotational axis of the rotatable shaft extending in an axial direction of the rotatable shaft;
        a rotor portion that is received in a rotor receiving chamber and is configured to rotate in response to rotation of the rotatable shaft;
        a suction hole portion, through which the fuel is suctioned into an inside of the rotor receiving chamber; and
        an outer peripheral wall that continuously extends all around the rotational axis and surrounds the suction hole portion;
    the suction filter includes:
        a filter element that is entirely placed on an axial side of the fuel pump where a bottom wall of the sub-tank is placed in the axial direction of the rotatable shaft, wherein the filter element is configured to filter the fuel and conduct the filtered fuel into an inside space of the filter element; and
        a joining member that is formed integrally in one piece and is configured to hold the filter element away from the bottom wall of the sub-tank installed in an inside of a fuel tank and also hold the filter element entirely away from the fuel pump, so that an axial extent of the filter element and an axial extent of the fuel pump do not overlap with each other in the axial direction of the rotatable shaft, wherein the joining member is entirely spaced away from the sub-tank and includes a columnar hole portion that has an inner peripheral wall and is configured in a columnar hole form, and an outer peripheral surface of the outer peripheral wall of the fuel pump and an inner peripheral surface of the inner peripheral wall of the columnar hole portion are opposed to each other and are fitted with each other, so that the columnar hole portion communicates between the inside space and the suction hole portion;
    the columnar hole portion is placed such that the rotational axis extends on an inner side of the inner peripheral wall;
    the fuel pump is surrounded by the inner peripheral wall at an inside of the columnar hole portion and further includes a planar bottom surface, in which the suction hole portion opens such that an opening end of the suction hole portion, through which the fuel is drawn into the suction hole portion, is located in a plane of the planar bottom surface without projecting outwardly from the planar bottom surface in the axial direction; and
    the joining member further includes:
        an opposing wall that is formed integrally with the joining member in one-piece and projects radially inward from the inner peripheral wall at least to the rotational axis and is opposed to the planar bottom surface in the axial direction such that the opposing wall of the joining member is arranged between the planar bottom surface of the fuel pump and the bottom wall of the sub-tank; and
        a connecting portion that is formed integrally with the opposing wall in one-piece, wherein the connecting portion is radially spaced from the inner peripheral wall and projects from a lower surface of the opposing wall toward the filter element and is joined to a framework that is placed in the inside space of the filter element to maintain a shape of the filter element.

2. The fuel pump unit according to claim 1 wherein the suction filter further includes a contact portion that contacts the fuel pump in the axial direction.

3. The fuel pump unit according to claim 2, wherein the contact portion is in a form of a ring that is connected to an opening part of the columnar hole portion on a radially outer side of the opening part of the columnar hole portion.

4. The fuel pump unit according to claim 1, wherein the columnar hole portion is configured in a cylindrical columnar hole form that is coaxial with the rotatable shaft.

5. The fuel pump unit according to claim 1, wherein the suction filter further includes an elastic member that is placed between the planar bottom surface and the opposing wall.

6. The fuel pump unit according to claim 1, wherein:
the rotor portion includes:
   an inner gear that includes a plurality of external teeth and is placed coaxially with the rotatable shaft; and
   an outer gear that includes a plurality of internal teeth and is meshed with the inner gear while the outer gear is eccentric to the inner gear; and
the columnar hole portion is placed such that an outer central axis, which serves as a rotational center of the outer gear and extends in the axial direction, extends on the inner side of the inner peripheral wall.

7. The fuel pump unit according to claim 1, wherein the connecting portion is joined to the framework along the rotational axis.

8. The fuel pump unit according to claim 1, wherein a radial gap is formed between the opposing wall and the inner peripheral wall of the columnar hole portion to enable a flow of the fuel from the inside space of the filter element into the suction hole portion through the radial gap.

* * * * *